United States Patent
Dickerson et al.

(10) Patent No.: US 8,448,626 B2
(45) Date of Patent: May 28, 2013

(54) EXHAUST SYSTEM FOR ENGINE BRAKING

(75) Inventors: Steven J. Dickerson, Lake in the Hills, IL (US); Luis Carlos Cattani, Aurora, IL (US); Martin R. Zielke, Lockport, IL (US); Richard Franzwa, Encinitas, CA (US); Qianfan Xin, Lake Zurich, IL (US); Paul Gottemoller, Palos Park, IL (US); Dirk Jungen, Wuerselen (DE)

(73) Assignee: International Engine Intellectual Property Company, LLC, Lisle, IL (US)

( * ) Notice: Subject to any disclaimer, the term of this patent is extended or adjusted under 35 U.S.C. 154(b) by 964 days.

(21) Appl. No.: 12/537,588

(22) Filed: Aug. 7, 2009

(65) Prior Publication Data

US 2010/0037856 A1 Feb. 18, 2010

Related U.S. Application Data

(60) Provisional application No. 61/088,634, filed on Aug. 13, 2008.

(51) Int. Cl.
| | |
|---|---|
| *F01L 13/06* | (2006.01) |
| *F01L 13/065* | (2006.01) |
| *F02D 13/04* | (2006.01) |
| *F02D 9/06* | (2006.01) |
| *F02B 37/24* | (2006.01) |

(52) U.S. Cl.
USPC ............. 123/323; 123/321; 60/602; 60/605.1

(58) Field of Classification Search
CPC .. F01L 3/06; F01L 13/065; F02B 37/24; F02D 9/06; F02D 41/0007; F02D 41/1448
USPC ................ 123/323; 60/598, 602, 600, 605.1, 60/605.2, 608, 611, 278, 280, 568.11, 568.17, 60/568.18; 701/108
See application file for complete search history.

(56) References Cited

U.S. PATENT DOCUMENTS

| | | | |
|---|---|---|---|
| 4,395,884 A | 8/1983 | Price | |
| 4,474,006 A | 10/1984 | Price et al. | |

(Continued)

FOREIGN PATENT DOCUMENTS

DE 3312093 A1 * 10/1984

*Primary Examiner* — Stephen K Cronin
*Assistant Examiner* — Raza Najmuddin
(74) *Attorney, Agent, or Firm* — Mark C. Bach; Jeffrey P. Calfa

(57) ABSTRACT

An engine braking system includes a turbocharger having a turbine and a compressor. An exhaust manifold includes a first pipe for channeling a first portion of the engine exhaust and a second pipe for channeling a second portion of the engine exhaust. The first and second pipes are connected to an inlet of the turbine. A cross pipe, as part of an exhaust gas recirculation (EGR) conduit, is open between the first and second pipes and at one end to the remaining portion of the EGR conduit. A valve can be arranged within the cross pipe and ca be operable in a first mode of operation to block flow between the first and second pipes and allow flow between the first pipe and the remaining portion of the EGR conduit and to allow flow between the first and second pipes and the inlet of the turbine. The valve is operable in a second mode of operation to allow flow between the first and second pipes, and to reduce or block flow between the second pipe and the turbine inlet.

15 Claims, 9 Drawing Sheets

U.S. PATENT DOCUMENTS

| | | | |
|---|---|---|---|
| 4,736,727 A | 4/1988 | Williams | |
| 5,035,637 A | 7/1991 | Mathews et al. | |
| 5,367,993 A | 11/1994 | Tulach et al. | |
| 5,449,956 A | 9/1995 | Williams | |
| 5,454,359 A | 10/1995 | Howell | |
| 5,463,992 A | 11/1995 | Swenson et al. | |
| 5,485,820 A | 1/1996 | Iwaszkiewicz | |
| 5,533,487 A | 7/1996 | Cailey | |
| 5,634,447 A | 6/1997 | Rowells | |
| 5,647,305 A | 7/1997 | Mulshine et al. | |
| 5,924,407 A | 7/1999 | Iwaszkiewicz et al. | |
| 5,937,960 A | 8/1999 | Dewey | |
| 5,970,928 A | 10/1999 | Smietanski et al. | |
| 6,006,732 A | 12/1999 | Oleksiewicz | |
| 6,006,733 A | 12/1999 | Oleksiewicz | |
| 6,014,960 A | 1/2000 | Oleksiewicz | |
| 6,016,459 A | 1/2000 | Isaac et al. | |
| 6,098,597 A | 8/2000 | Warmoth et al. | |
| 6,148,793 A | 11/2000 | Faletti et al. | |
| 6,223,534 B1 | 5/2001 | Erdmann et al. | |
| 6,223,720 B1 | 5/2001 | Kramer et al. | |
| 6,230,682 B1 * | 5/2001 | Gustafsson et al. | 123/323 |
| 6,247,446 B1 | 6/2001 | Fassler et al. | |
| 6,248,041 B1 | 6/2001 | Den Besten | |
| 6,374,803 B1 | 4/2002 | Warmoth et al. | |
| 6,374,805 B1 | 4/2002 | Seymour, II et al. | |
| 6,374,806 B1 | 4/2002 | Keeley et al. | |
| 6,394,059 B2 | 5/2002 | Guzman | |
| 6,395,048 B1 | 5/2002 | Yoder et al. | |
| 6,398,692 B1 | 6/2002 | Isaac | |
| 6,401,700 B2 | 6/2002 | Balekai et al. | |
| 6,408,829 B1 | 6/2002 | Lei et al. | |
| 6,425,370 B1 | 7/2002 | Kramer | |
| 6,427,445 B1 | 8/2002 | Isaac et al. | |
| 6,434,938 B1 | 8/2002 | Sun et al. | |
| 6,450,146 B1 | 9/2002 | Dickerson et al. | |
| 6,460,512 B1 | 10/2002 | Serio | |
| 6,474,304 B1 | 11/2002 | Lei | |
| 6,513,507 B2 | 2/2003 | Balekai et al. | |
| 6,539,909 B2 | 4/2003 | Yager | |
| 6,584,391 B2 | 6/2003 | Lack | |
| 6,594,996 B2 | 7/2003 | Yang | |
| 6,705,282 B2 | 3/2004 | Hlavac | |
| 6,772,742 B2 | 8/2004 | Lei et al. | |
| 6,779,506 B1 | 8/2004 | Beaucaire et al. | |
| 6,968,832 B1 | 11/2005 | Rowells | |
| 7,363,761 B1 | 4/2008 | Dickerson | |
| 7,574,862 B2 * | 8/2009 | Giselmo et al. | 60/612 |
| 8,307,646 B2 * | 11/2012 | Cattani et al. | 60/605.2 |
| 2001/0032466 A1 * | 10/2001 | Waszkiewicz et al. | 60/602 |
| 2002/0073978 A1 * | 6/2002 | Feucht et al. | 123/568.11 |
| 2002/0088231 A1 * | 7/2002 | Coleman et al. | 60/605.2 |
| 2003/0101724 A1 * | 6/2003 | Zurawski et al. | 60/605.2 |
| 2003/0114978 A1 * | 6/2003 | Rimnac et al. | 701/108 |
| 2004/0134193 A1 * | 7/2004 | Klingel | 60/612 |
| 2004/0194463 A1 * | 10/2004 | Yanagisawa et al. | 60/605.2 |
| 2004/0237922 A1 | 12/2004 | Merrick et al. | |
| 2005/0247294 A1 | 11/2005 | Rowells | |
| 2006/0021346 A1 * | 2/2006 | Whelan et al. | 60/605.2 |
| 2006/0086089 A1 * | 4/2006 | Ge | 60/599 |
| 2007/0039321 A1 * | 2/2007 | Sheidler et al. | 60/599 |
| 2007/0175214 A1 * | 8/2007 | Reisdorf et al. | 60/599 |
| 2008/0098733 A1 | 5/2008 | Dickerson | |
| 2010/0146965 A1 * | 6/2010 | Easley et al. | 60/602 |
| 2011/0120123 A1 * | 5/2011 | Dickerson et al. | 60/602 |

* cited by examiner

EXHAUST SYSTEM FOR ENGINE BRAKING

REFERENCE TO RELATED APPLICATION AND PRIORITY CLAIM

This application claims the priority of Provisional Patent Application No. 61/088,634, filed on 13 Aug. 2008, the entire content of which is incorporated herein by reference.

FIELD OF THE INVENTION

This invention relates to internal combustion engines, including but not limited to control and operation of a turbocharger, EGR system and engine braking for an internal combustion engine.

BACKGROUND OF THE INVENTION

Adequate and reliable braking for vehicles, particularly large tractor-trailer vehicles is desirable. While drum or disc wheel brakes are capable of absorbing a large amount of energy over a short period of time, the absorbed energy is transformed into heat in the braking mechanism.

Multi-cylinder internal combustion engines, particularly diesel engines for large tractor-trailer trucks, may include an exhaust-gas turbocharger. The turbocharger includes a turbine that drives a compressor via a shaft, which generates an increased intake air pressure in the intake duct during normal operation.

Braking systems are known which include exhaust brakes which inhibit the flow of exhaust gases through the exhaust system, and compression release systems wherein the energy required to compress the intake air during the compression stroke of the engine is dissipated by exhausting the compressed air through the exhaust system.

In order to achieve a high engine-braking action a brake valve in the exhaust line may be closed during braking, and excess pressure is built up in the exhaust line upstream of the brake valve. The built-up exhaust gas flows at high velocity into the turbine and acts on the turbine rotor, whereupon the driven compressor increases pressure in the air intake duct. The cylinders are subjected to an increased charging pressure. In the exhaust system, an excess pressure develops between the cylinder outlet and the brake valve and counteracts the discharge of the air compressed in the cylinder into the exhaust tract via the exhaust valves. During braking, the piston performs compression work against the high excess pressure in the exhaust tract, with the result that a strong braking action is achieved.

Another method disclosed in U.S. Pat. No. 4,395,884 includes employing a turbocharged engine equipped with a double entry turbine and a compression release engine retarder in combination with a diverter valve. During engine braking, the diverter valve directs the flow of air through one scroll of the divided volute of the turbine. When engine braking is employed, the turbine speed is maximized, and the inlet manifold pressure is also maximized, thereby maximizing braking horsepower developed by the engine.

Other methods employ a variable geometry turbocharger (VGT). When engine braking is commanded, the variable geometry turbocharger is "clamped down" which means the turbine vanes are closed and used to generate both high exhaust manifold pressure and high turbine speeds and high turbocharger speeds. Increasing the turbocharger speed in turn increases the engine airflow and available engine brake power. The method disclosed in U.S. Pat. No. 6,594,996 includes controlling the geometry of the turbocharger for engine braking as a function of engine speed and pressure (exhaust or intake, preferably exhaust). U.S. Pat. No. 6,148,793 describes a brake control for an engine having a variable geometry turbocharger which is controllable to vary intake manifold pressure. The engine is operable in a braking mode using a turbocharger geometry actuator for varying turbocharger geometry, and using an exhaust valve actuator for opening an exhaust valve of the engine.

Other methods of using turbochargers for engine braking are disclosed in U.S. Pat. Nos. 6,223,534 and 4,474,006.

Controlled engine exhaust gas recirculation is a known technique for reducing oxides of nitrogen in products of combustion that are exhausted from an internal combustion engine to atmosphere. A typical EGR system comprises an EGR valve that is controlled in accordance with engine operating conditions to regulate the amount of engine exhaust gas that is re-circulated from the engine exhaust system to the air intake system so as to limit the combustion temperature and hence reduce the formation of oxides of nitrogen during combustion. Such a system is described for example in U.S. Pat. No. 7,363,761.

SUMMARY OF THE INVENTION

The exemplary embodiments of the invention provide an engine braking system including a turbocharger having a turbine and a compressor. An exhaust manifold includes a first pipe for channeling a first portion of the engine exhaust and a second pipe for channeling a second portion of the engine exhaust. The first and second pipes are connected to an inlet of the turbine. A cross pipe, as part of an exhaust gas recirculation (EGR) conduit, is open between the first and second pipes and at one end to the remaining portion of the EGR conduit. A valve can be arranged within the cross pipe and is operable in a first mode of operation to block flow between the first and second pipes and allow flow between the first pipe and the remaining portion of the EGR conduit and to allow flow between the first and second pipes and the inlet of the turbine. The valve is operable in a second mode of operation to allow flow between the first and second pipes, and to block flow between the second pipe and the turbine inlet. Thus, a substantially reduced flow occurs between the second pipe and the turbine inlet and a substantially increased flow occurs between the first pipe and the turbine inlet. One example of the second mode of operation is that no flow occurs between the second pipe and the turbine inlet, no flow occurs through the remaining portion of the EGR conduit, the second portion of the exhaust gas flows through the cross pipe, and substantially the first and second portions of the total exhaust flow is channeled through the first pipe and into the turbine inlet.

According to the exemplary embodiment, during operation in the second mode a control positions the valve and closes an EGR valve that is within the EGR conduit. In the first mode of operation, the EGR valve is controlled by the engine control module and software therein to reduce emissions.

The turbine may comprise a variable geometry turbine and/or a divided volute turbine.

According to the exemplary embodiment, the valve comprises a flapper valve rotatable between two positions corresponding to the first and second modes.

The exemplary embodiment of the invention provides an exhaust and air intake system for an engine. The system includes a first exhaust pipe means for channeling a first portion of exhaust gas generated by the engine, and a second exhaust pipe means for channeling a second portion of the exhaust gas generated by the engine. An air intake system includes an air compressor, an air inlet to the air compressor, and a compressed air intake manifold. A turbine drives the air compressor; the turbine having a turbine inlet for flow-connecting the first and second exhaust pipe means. An exhaust gas recirculation (EGR) means selectively connects the first pipe means, the second pipe means and the air intake system and selectively delivers exhaust gas to the air intake system. The EGR system can also selectively channel exhaust gas flow, in a reverse direction, between the first and second pipe means. A valve means, in a first mode of operation, opens exhaust gas flow between the second pipe means and the turbine inlet and closes exhaust gas flow between the second pipe means and the exhaust gas recirculation means. Accordingly, an amount of exhaust gas from the first portion of exhaust gas flows through the first pipe means into the exhaust gas recirculation means and a remaining amount of the first portion of exhaust gas flows from the first pipe means to the turbine inlet. The second portion of exhaust gas flows through the second pipe means into the turbine inlet. The valve means, in a second mode of operation, closes exhaust gas flow between the second pipe means and the turbine inlet and opens exhaust gas flow between the second pipe means and the exhaust gas recirculation means.

The valve means can include a flapper or butterfly plate valve located between the exhaust gas recirculation means and the second pipe means, and an EGR valve located in the exhaust gas recirculation means. In the second mode of operation, the EGR valve can be substantially closed or made more restrictive to flow, and in the first mode of operation the EGR valve is controlled to reduce engine emissions.

Numerous other advantages and features of the present invention will be become readily apparent from the following detailed description of the invention and the embodiments thereof, from the claims and from the accompanying drawings.

DETAILED DESCRIPTION

Figure 1:
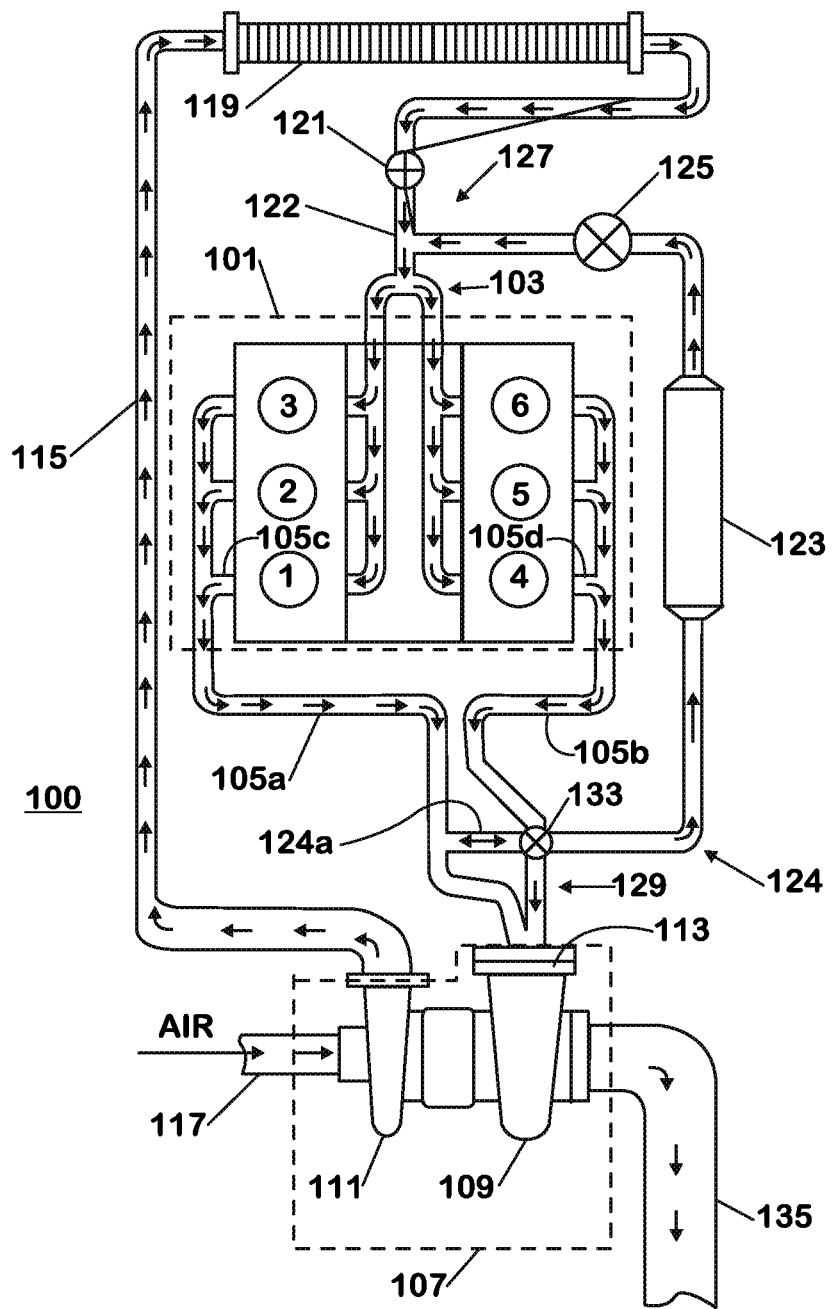
FIG. 1 is a block diagram of an engine system that includes a turbocharger and an exhaust gas control valve in accordance with an exemplary embodiment of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An engine 100 is shown schematically in FIG. 1. The engine 100 has a block 101 that includes a plurality of cylinders. The cylinders in the block 101 are fluidly connected to an intake system 103 and to an exhaust system 105. The exhaust system includes a first pipe 105a from cylinders 1, 2 and 3 of one bank of cylinders and a second pipe 105b from cylinders 4, 5 and 6 of an opposite bank of cylinders. A turbocharger 107 includes a turbine 109. The turbine 109 shown has a single turbine inlet port 113 connected to the exhaust system 105. The turbocharger 107 may additionally include a compressor 111 connected to the intake system 103 through an inlet air passage 115.

During operation of the engine 100, air may enter the compressor 111 through an air inlet 117. Compressed air may exit the compressor 111 through the inlet air passage 115, and pass through an optional charge air cooler 119 and an optional inlet throttle 121 before entering an intake manifold 122 of the intake system 103.

Exhaust gas from the exhaust system 105 may be routed through an exhaust gas recirculation (EGR) conduit 124 to an exhaust gas recirculation (EGR) cooler 123 and pass through an EGR valve 125 before meeting and mixing with air from the inlet throttle 121 at a junction 127.

The inlet port 113 of the turbine 109 may be connected to the exhaust pipes 105a, 105b in a manner that forms a distribution manifold 129. Exhaust gas passing through the turbine 109 may exit the engine system 100 through a tailpipe 135.

At times when the EGR valve 125 is at least partially open, exhaust gas flows through the first pipe 105a, through the conduit 124, through the EGR cooler 123, through the EGR valve 125 and into the junction 127 where it mixes with air from the inlet throttle 121. An amount of exhaust gas being re-circulated through the EGR valve 125 may depend on an opening percentage of the EGR valve 125.

The conduit 124 is also connected to the second pipe 105b. A relatively short cross pipe 124a of the conduit 124 is arranged between the pipes 105a and 105b. The cross pipe 124a facilitates exhaust gas flow in either direction depending on the operating mode. An engine brake valve 133 is positioned within the intersection of the conduit 124 and the second pipe 105b. During normal operation, the valve 133 closes the flow connection between the conduit 124 and the second pipe 105b. During normal operation, exhaust gas flows from the first pipe 105a to the inlet 113 of the turbine and some amount of exhaust gas flows from the first pipe 105a to the EGR cooler 123. Exhaust gas flowing within the second pipe 105b flows through the valve 133 and into the turbine inlet 113 and generally does not flow through the valve 133 into or from the conduit 124.

During engine braking however, the valve 133 changes position and opens a flow path through the cross pipe 124a from the second pipe 105b to the first pipe 105a and closes the flow path from the second pipe 105b to the turbine inlet 113. The valve 133 can be configured to also close the flow path from the second pipe 105b to the EGR cooler 123 or alternately the EGR valve 125 can be closed to close this flow path.

Because the exhaust gas from both the bank of cylinders 1, 2 and 3 and the bank of cylinders 4, 5 and 6 must pass through one side of the turbine, the turbine speed is increased. For a variable geometry turbocharger the vanes can also be changed to increase turbine speed. Increased turbine speed corresponds to an increased compressor speed and increased air flow through the engine increases the capability of the engine for engine braking. A more complete description of engine braking can be found in U.S. Pat. Nos. 6,594,996; 6,223,534; 6,148,793; 4,474,006 and 4,395,884; all herein incorporated by reference.

Figure 4:
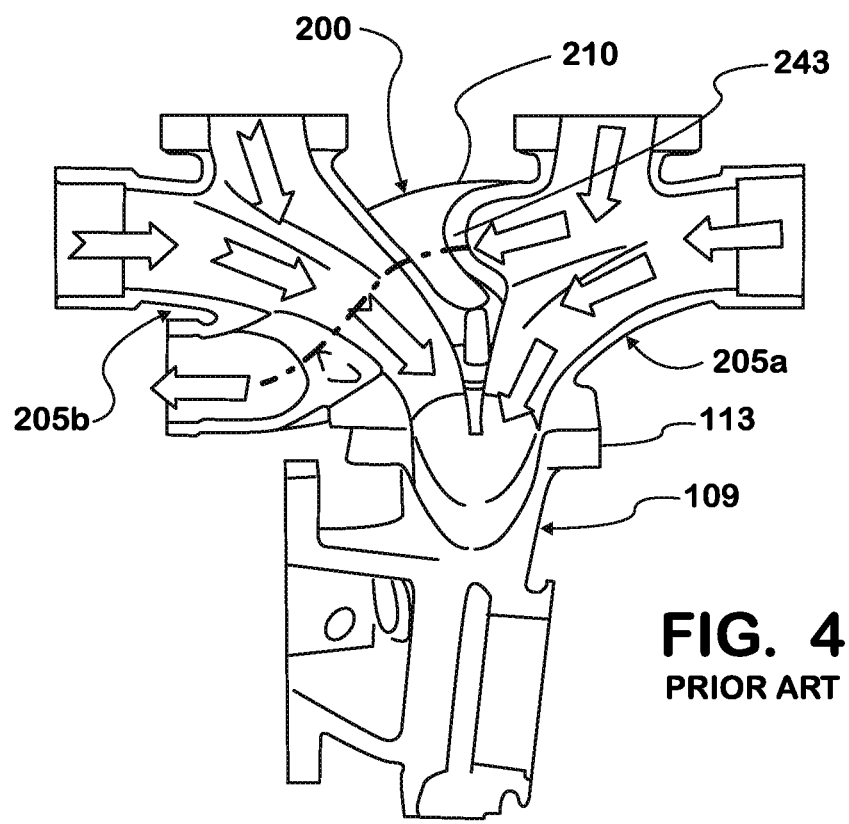
FIG. 4 is a fragmentary sectional view of a portion of a prior art exhaust system and turbocharger in a normal operating mode.

A prior art arrangement of an exhaust manifold 200 and turbine 109 is shown in FIG. 4. The exhaust manifold 200 includes a first exhaust pipe 205a receiving exhaust gas from cylinders 1, 2 and 3 and a second exhaust pipe 205b receiving exhaust gas from cylinders 4, 5 and 6 that are flow connected to the turbine inlet 113. An EGR conduit 210 branches off the pipe 205a and is located behind the pipe 205b but not flow connected to the pipe 205b. EGR flow is taken from the pipe 205a only and is controlled by an EGR valve (not shown) downstream and in flow communication with the EGR conduit 210.

Figure 2:
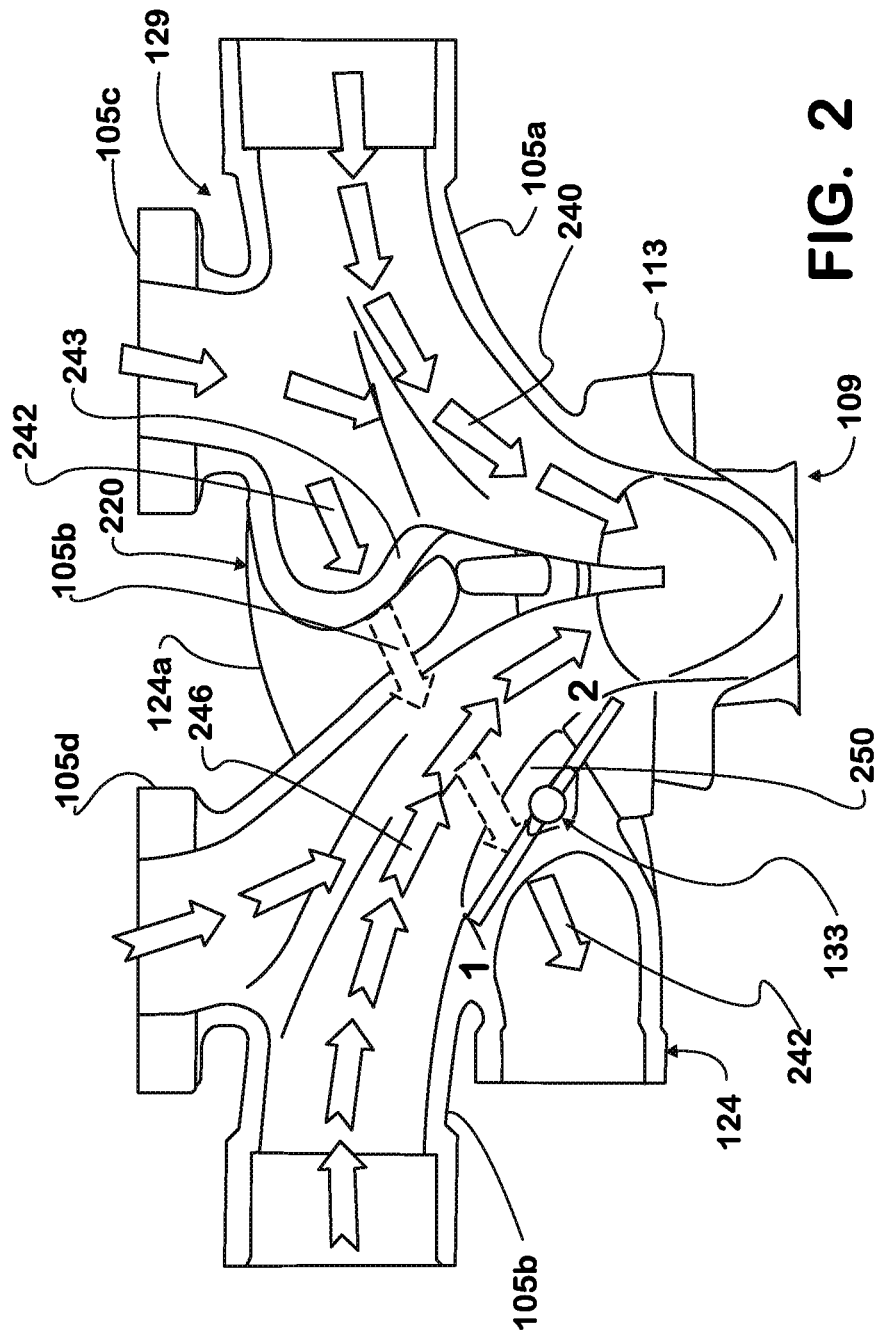
FIG. 2 is fragmentary sectional view of a portion of the exhaust system and turbocharger shown in FIG. 1 in a normal operating mode.
Figure 3:
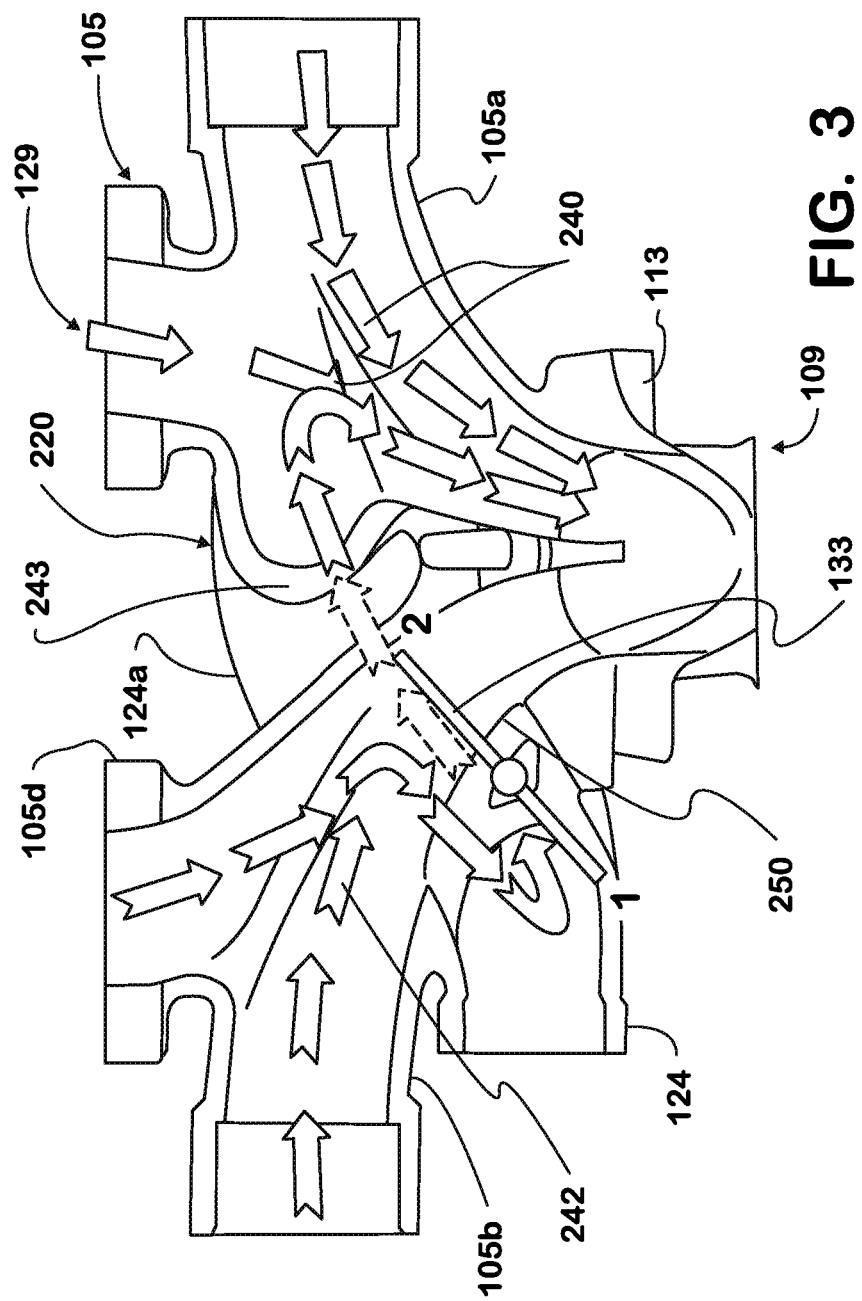
FIG. 3 is a fragmentary sectional view of the exhaust system and turbocharger shown in FIG. 2 in an engine braking mode of operation.

FIGS. 2 and 3 illustrate a modification of the arrangement shown in FIG. 4 in order to configure the exhaust system as shown in FIG. 1. A modified exhaust manifold 220 is provided.

FIG. 2 shows the brake valve 133 in a first mode of operation. This mode generally corresponds to a normal operation (no engine braking) of the engine. A first exhaust gas portion 240 flowing through a branch pipe 105c from no. 1 cylinder (see FIG. 1) and through the first pipe 105a from nos. 2 and 3 cylinders, enters the turbine inlet. A controlled amount of exhaust gas, the EGR exhaust gas 242, passes through an opening 243 in the first pipe 105a and into the cross pipe 124a (beneath the second pipe 105b) and through the EGR conduit 124 to the EGR cooler 123 (shown in FIG. 1). The EGR exhaust gas 242 is controlled by the EGR valve 125 (shown in FIG. 1) that is downstream of the cooler 123. The EGR valve 125 is controlled by the engine control unit or computer to limit emissions. A second exhaust gas portion 246 of exhaust gas flows through a branch pipe 105d from no. 4 cylinder (see FIG. 1) and through the second pipe 105b from the nos. 5 and 6 cylinders, to the turbine inlet 113. The valve 133 closes an opening 250 formed or cut though a wall of the second pipe 105b that would otherwise open the second pipe 105b to the cross pipe 124a.

FIG. 3 shows the brake valve 133 in a second mode of operation. This mode corresponds to an engine braking mode of operation. During engine braking, FIG. 3 demonstrates one aspect of operation, that is, the re-routing of exhaust gas to increase the speed of the turbine and thus increase the amount of compressed air into the engine. In addition to the operation described in FIG. 3, one or more exhaust valves of the engine can be opened, as described in U.S. Pat. Nos. 6,594,996; 6,148,793; 6,779,506; 6,772,742 or 6,705,282, herein incorporated by reference, to maximizing braking horsepower developed by the engine.

The first exhaust gas portion 240 flowing through the branch pipe 105c from the no. 1 cylinder (see FIG. 1) and through the first pipe 105a from nos. 2 and 3 cylinders, enters the turbine inlet 113. The valve 133 has been rotated to be positioned into the second pipe 105b to block the EGR exhaust gas 242 from entering the turbine inlet 113 directly from the second pipe 105b. The second exhaust gas portion 246 flowing through the branch pipe 105d from no. 4 cylinder (see FIG. 1) and through the second pipe 105b from the nos. 5 and 6 cylinders, flows through the opening 250 in the wall of the second pipe 105b, and into the cross pipe 124a (beneath or behind the second pipe 105b) in a reverse direction compared to the flow through the cross pipe 124a in the first mode of operation. The second exhaust gas portion 242 must join the first exhaust gas portion 240 and flow though the first pipe 105a into the turbine inlet 113. During engine braking, the EGR valve 125 can be closed or otherwise controlled to block or limit the EGR flow 246 through the conduit 124 to the cooler 123.

Figure 6:
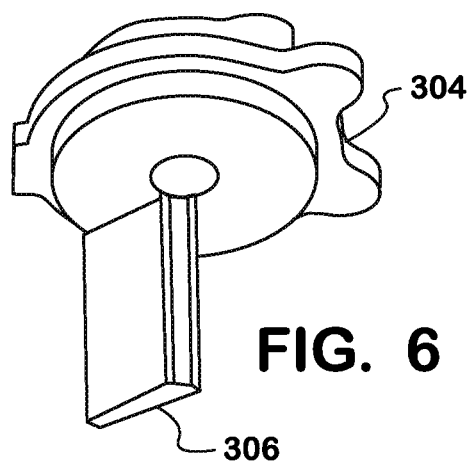
FIG. 6 is a perspective view of a portion of the exhaust system shown in FIG. 5.
Figure 5:
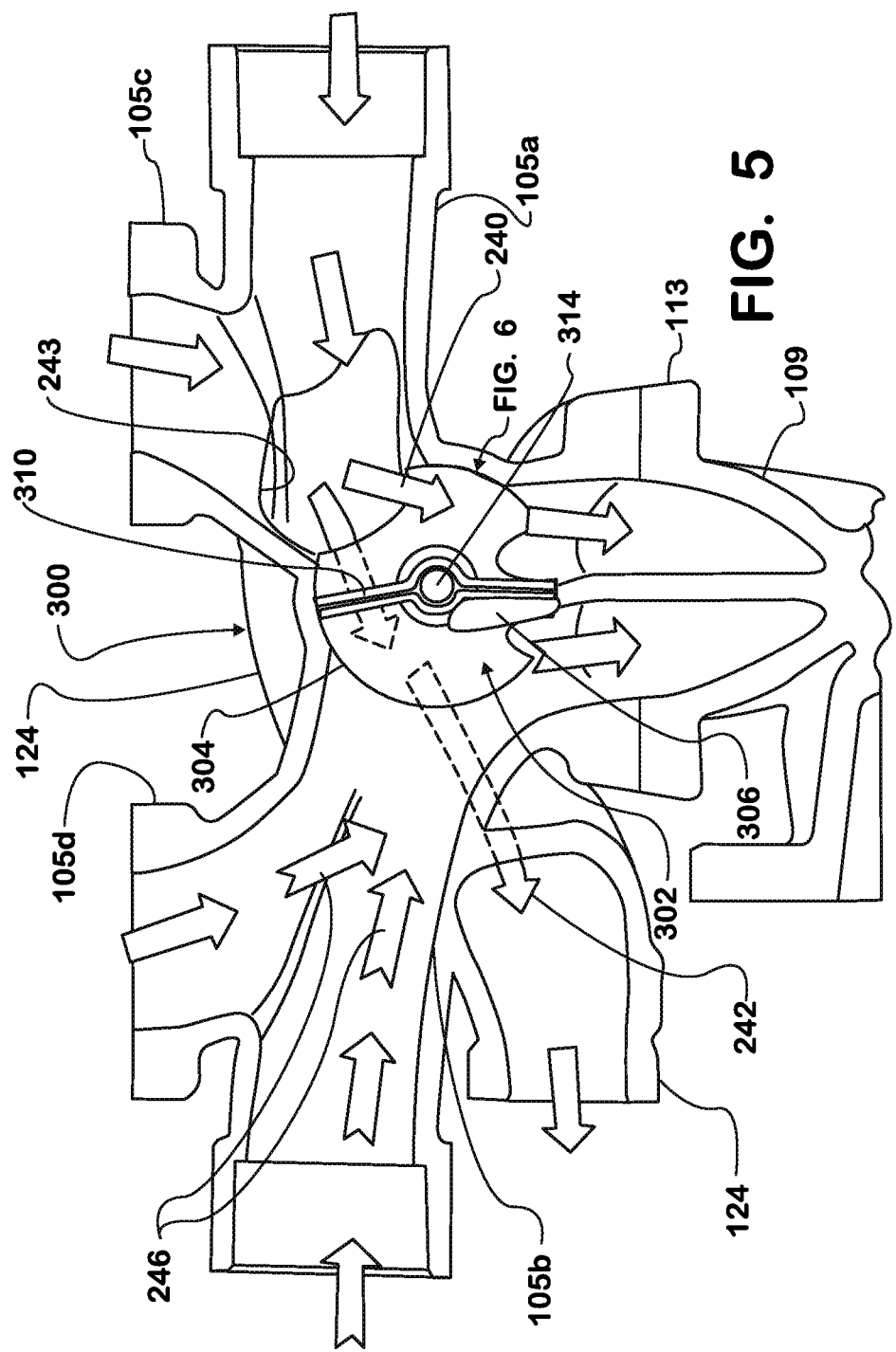
FIG. 5 is a fragmentary sectional view of an alternate exemplary embodiment exhaust system and turbocharger in accordance with the invention shown in a normal mode of operation.

FIG. 5 illustrates a further embodiment of the invention wherein a modified exhaust manifold 300 and turbine 109 shown in FIG. 4 has been modified with a central valve 302. FIG. 5 shows a first mode of operation. This mode generally corresponds to a normal operation (no engine braking) of the engine. The valve 302 includes a base 304 with a valve seat 306 (shown in FIG. 6). A rotatable butterfly-type valve element 310 is mounted on an axle or spindle 314. In the first mode of operation shown in FIG. 5, the valve allows the first exhaust gas portion 240 from the branch pipe 105c and the first pipe 105a to flow into the turbine inlet. The EGR exhaust gas 242 flows through the opening 243 in the wall of the first pipe 105a, through the EGR conduit 124 behind or beneath the second pipe 105b, and to the EGR cooler and EGR valve as shown in FIG. 1. There is no opening 250 in the embodiment shown in FIGS. 5 and 7. The second exhaust gas portion 246 from the branch pipe 105d and the second pipe 105b flows into the turbine inlet 113.

Figure 7:
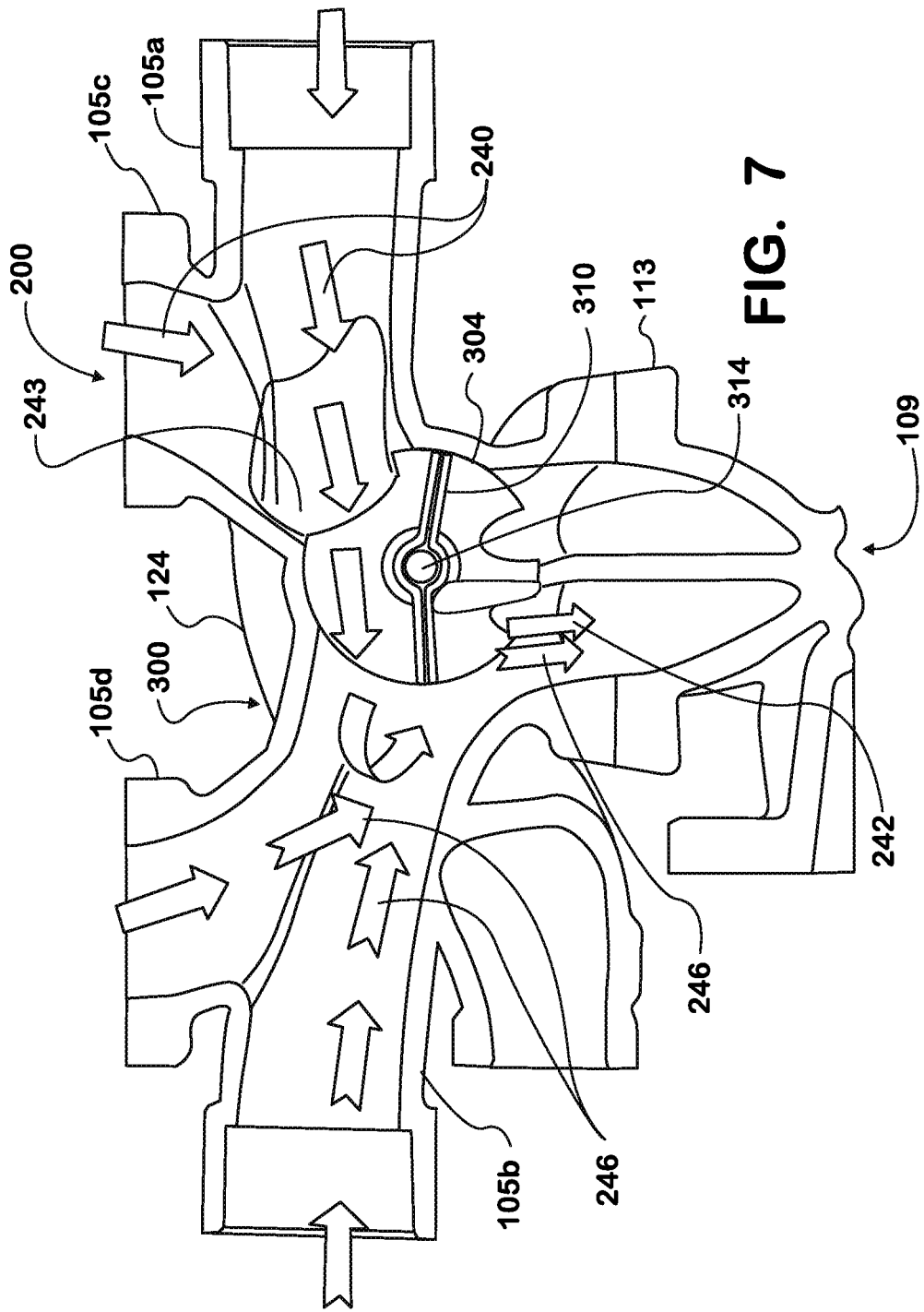
FIG. 7 is a fragmentary sectional view of the exhaust system shown in FIG. 5 in an engine braking mode of operation

FIG. 7 shows a second mode of operation. This mode corresponds to an engine braking mode of operation. During engine braking, FIG. 7 demonstrates one aspect of operation, that is, the re-routing of exhaust gas to increase the speed of the turbine and thus increase the amount of compressed air into the engine. In addition to the operation described in FIG. 7, one or more exhaust valves of the engine can be opened, as described in U.S. Pat. Nos. 6,594,996; 6,148,793; 6,779,506; 6,772,742 or 6,705,282, herein incorporated by reference, to maximizing braking horsepower developed by the engine.

The valve element 310 has been pivoted about the axle or spindle 314 by an external actuator (not shown) to be in a position wherein the first exhaust gas portion 240 from the branch pipe 105c and the first pipe 105a cannot enter the turbine inlet 113 directly but must pass over the valve element 310 to enter the second pipe 105b to flow with the second exhaust gas portion 246 into the inlet 113. The EGR valve 125 (shown in FIG. 1) can be closed or otherwise controlled to block or limit the EGR exhaust gas 242 though the opening 243 and the EGR conduit 124 to the cooler 123 (shown in FIG. 1).

Figure 8:
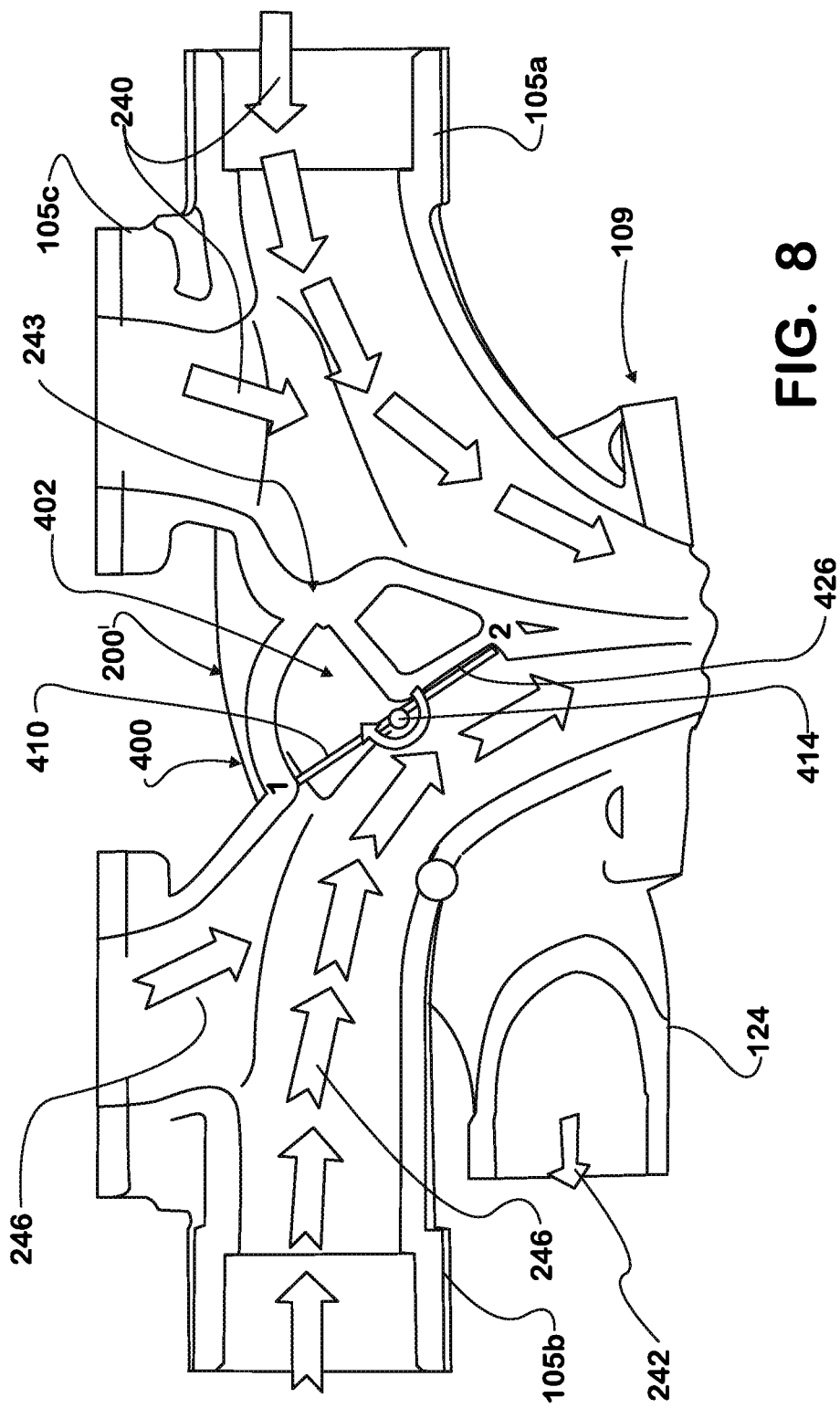
FIG. 8 is a fragmentary sectional view of a further alternate exemplary embodiment exhaust system and turbocharger in accordance with the invention shown in a normal mode of operation.
Figure 9:
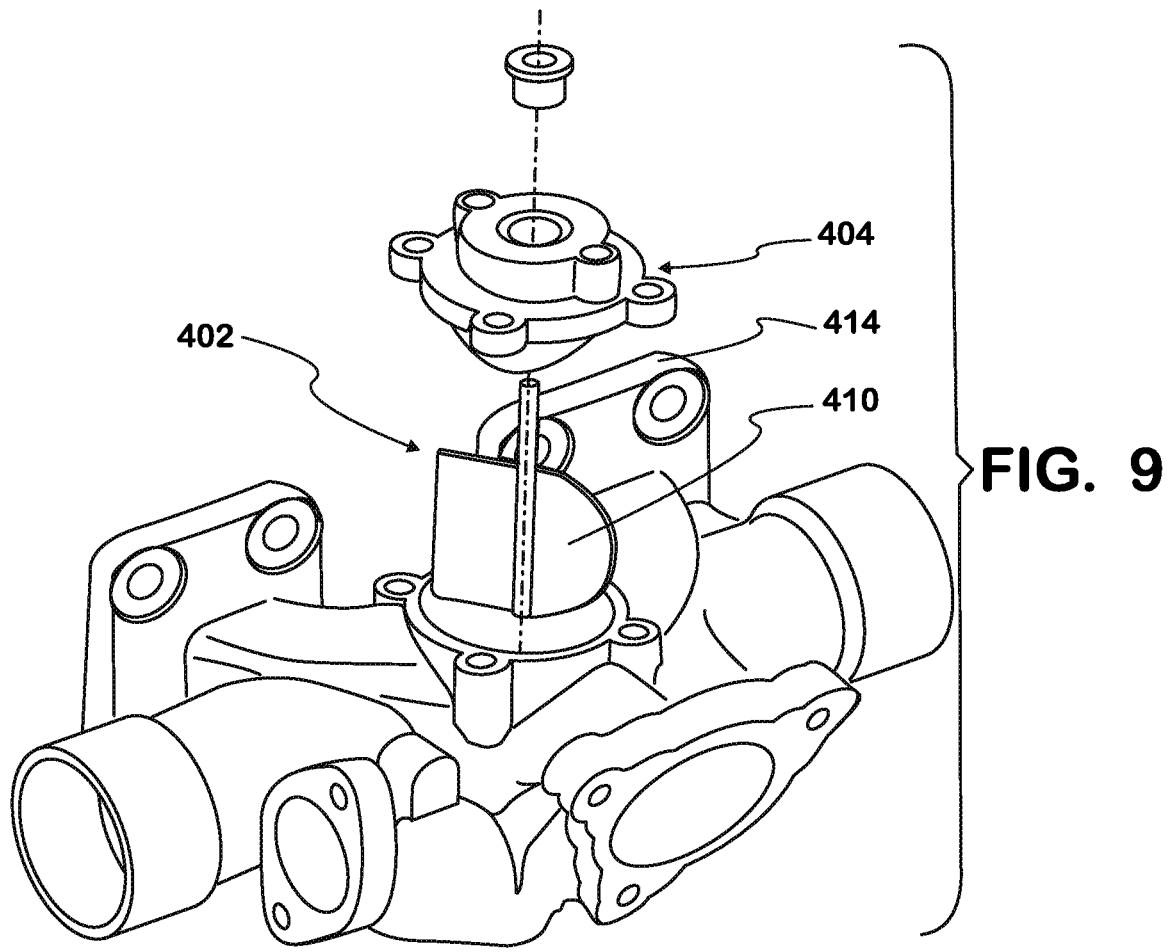
FIG. 9 is an exploded perspective view of a portion of the exhaust system shown in FIG. 8.
Figure 10:
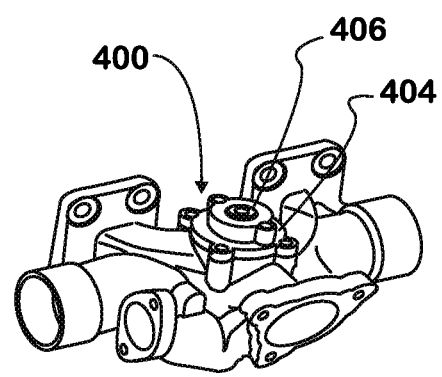
FIG. 10 is a reduced perspective view of the portion of the exhaust system shown in FIG. 9 as assembled.

FIG. 8 illustrates a still further embodiment of the invention wherein a modified exhaust manifold 400 and turbine 109 shown in FIG. 4 has been modified with a central valve 402. FIG. 8 shows a first mode of operation. This mode generally corresponds to a normal operation (no engine braking) of the engine. The valve 402 includes a cover 404 with a bushing 406 that journals and seals a spindle 414 (shown in FIG. 9). A rotatable butterfly-type valve element 410 is mounted on the spindle 414.

In the first mode of operation shown in FIG. 8, the valve 402 allows the first exhaust gas portion 240 from the branch pipe 105c and the first pipe 105a to flow into the turbine inlet. The EGR exhaust gas 242 flows through the opening 243 in the wall of the first pipe 105a, through the EGR conduit 124 behind or beneath the second pipe 105b, and to the EGR cooler and EGR valve as shown in FIG. 1. There is no opening 250 in the embodiment shown in FIGS. 8 and 11. The second exhaust gas portion 246 from the branch pipe 105d and the second pipe 105b flows into the turbine inlet 113.

A flat stop surface 426 of the manifold 400 is provided to support the butterfly element 410.

Figure 11:
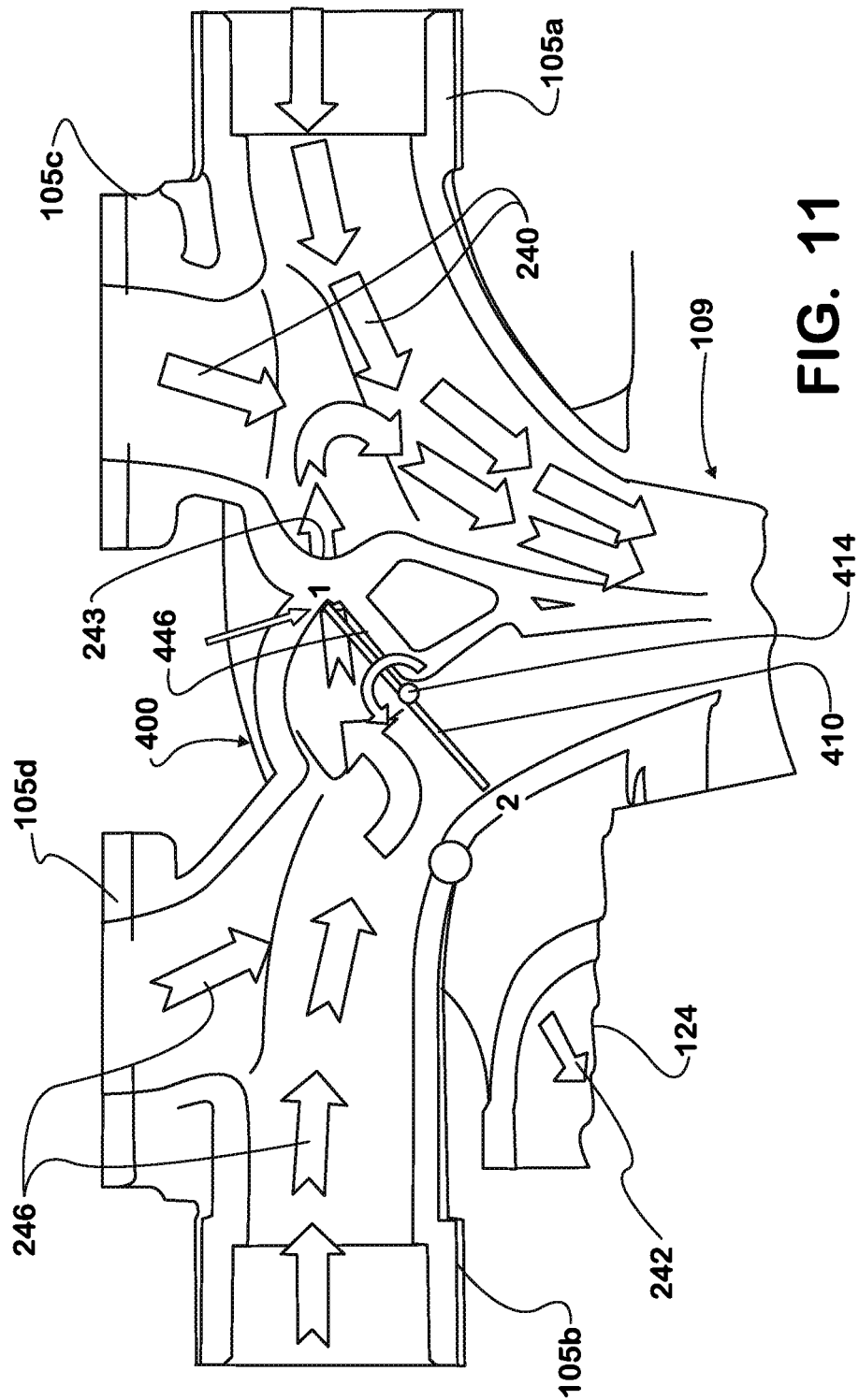
FIG. 11 is a fragmentary sectional view of the exhaust system shown in FIG. 8 in an engine braking mode of operation.

FIG. 11 shows a second mode of operation. This mode corresponds to an engine braking mode of operation. During engine braking, FIG. 11 demonstrates one aspect of operation, that is, the re-routing of exhaust gas to increase the speed of the turbine and thus increase the amount of compressed air into the engine. In addition to the operation described in FIG. 11, one or more exhaust valves of the engine can be opened, as described in U.S. Pat. Nos. 6,594,996; 6,148,793; 6,779,506; 6,772,742 or 6,705,282, herein incorporated by reference, to maximizing braking horsepower developed by the engine.

The valve element 410 has been pivoted about the spindle 414 by an external actuator (not shown) to be in a position wherein the second exhaust gas portion 246 from the branch pipes 105b and 105d cannot enter the turbine inlet 113 directly but must pass over the valve element 410 and through the opening 243 to enter the first pipe 105a to flow with the first exhaust gas portion 240 into the inlet 113. The EGR valve 125 (shown in FIG. 1) can be closed or otherwise controlled to block or limit the EGR exhaust gas 242 though the opening 243 and the EGR conduit 124 to the cooler 123 (shown in FIG. 1).

A flat stop surface 446 of the manifold 400 is provided to support the butterfly element 410.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An engine braking system, comprising:
a turbocharger having a turbine and a compressor;
an exhaust manifold having a first pipe for channeling a first portion of the engine exhaust and a second pipe for channeling a second portion of the engine exhaust;
said first and second pipes flow-connected to an inlet of the turbine;
a cross pipe open between the first and second pipes and at one end to an exhaust gas recirculation (EGR) conduit;
a valve arranged within the cross pipe and operable in a first mode to block flow between the first and second pipes and allow flow between the first pipe and the EGR conduit and allow flow between the second pipe and the inlet of the turbine, and operable in a second mode to allow flow between the first and second pipes, and block flow between the second pipe and the turbine inlet.

2. The engine braking system according to claim 1, comprising a control and an EGR valve, and for operation in the second mode the control positions the valve in the second mode and closes the EGR valve.

3. The engine braking system according to claim 1, wherein the turbine comprises a variable vane geometry turbine.

4. The engine braking system according to claim 1, wherein the turbine comprises a divided volute turbine.

5. The engine braking system according to claim 1, wherein the valve comprises a flapper valve rotatable between two positions corresponding to the first and second modes.

6. An exhaust and air intake system for an engine, comprising:
a first exhaust pipe channeling a first portion of exhaust gas generated by the engine, having a first outlet and a second exhaust pipe channeling a second portion of the exhaust gas generated by the engine, having a second outlet;
an air intake system including an air compressor, an air inlet to the air compressor, and a compressed air intake manifold;
a turbine driving the air compressor, the turbine having an inlet for connecting the first and second outlets of the first and second pipes respectively;
an exhaust gas recirculation conduit connected between the first pipe and the second pipe and the air intake system;
a valve system arranged in a first mode of operation, to open the first pipe to the exhaust gas recirculation conduit in order to deliver an amount of exhaust gas into the compressed air intake manifold, and in a second mode of operation, to close exhaust gas flow from the second pipe to the second outlet and direct the second portion of exhaust gas from the second pipe through the exhaust gas recirculation conduit, through the first pipe, through the first outlet, and into the turbine inlet.

7. The exhaust and air intake system according to claim 6, wherein the valve system includes an EGR valve located in the exhaust gas recirculation conduit, wherein in the second mode of operation, the EGR valve is substantially closed, and in the first mode of operation the EGR valve is controlled to reduce engine emissions.

8. The exhaust and air intake system according to claim 6, wherein the turbine comprises a variable vane geometry turbine.

9. The exhaust and air intake system according to claim 6, wherein the turbine comprises a divided volute turbine.

10. The exhaust and air intake system according to claim 6, wherein the valve comprises a flapper valve rotatable between two positions corresponding to the first and second modes.

11. An exhaust and air intake system for an engine, comprising:
a first exhaust pipe means for channeling a first portion of exhaust gas generated by the engine, and a second exhaust pipe means for channeling a second portion of the exhaust gas generated by the engine;
an air intake system including an air compressor, an air inlet to the air compressor, and a compressed air intake manifold;
a turbine driving the air compressor, the turbine having a turbine inlet for flow-connecting the first and second exhaust pipe means;
an exhaust gas recirculation means for selectively connecting the first pipe means, the second pipe means and the air intake system and for selectively delivering exhaust gas to the air intake system or channeling exhaust gas flow between the first and second pipe means;
a valve means for, in a first mode of operation, opening exhaust gas flow between the second pipe means and the turbine inlet and for closing exhaust gas flow between the second pipe means and the exhaust gas recirculation means, such that an amount of exhaust gas from the first portion of exhaust gas flows through the first pipe means into the exhaust gas recirculation means and a remaining amount of the first portion of exhaust gas flows from the first pipe means to the turbine inlet, and the second portion of exhaust gas flows through the second pipe means into the turbine inlet, and for, in a second mode of operation, closing exhaust gas flow between the second pipe means and the turbine inlet and opening exhaust gas flow between the second pipe means and the exhaust gas recirculation means.

12. The exhaust and air intake system according to claim 11, wherein the valve means includes a flapper valve located between the exhaust gas recirculation means and the second pipe means, and an EGR valve located in the exhaust gas recirculation means, wherein in the second mode of operation, the EGR valve is substantially closed, and in the first mode of operation the EGR valve is controlled to reduce engine emissions.

13. The exhaust and air intake system according to claim 11, wherein the turbine comprises a variable geometry turbine.

14. The exhaust and air intake system according to claim 11, wherein the turbine comprises a divided volute turbine.

15. The exhaust and air intake system according to claim 11, wherein the valve means comprises a flapper valve rotatable between two positions corresponding to the first and second modes.

* * * * *